(12) United States Patent
Sato

(10) Patent No.: US 10,400,832 B2
(45) Date of Patent: Sep. 3, 2019

(54) FLUID COUPLING

(71) Applicant: EXEDY Corporation, Neyagawa-shi, Osaka (JP)

(72) Inventor: Keiji Sato, Neyagawa (JP)

(73) Assignee: EXEDY CORPORATION, Neyagawa-Shi, Osaka (JP)

(*) Notice: Subject to any disclaimer, the term of this patent is extended or adjusted under 35 U.S.C. 154(b) by 295 days.

(21) Appl. No.: 15/516,327

(22) PCT Filed: Aug. 7, 2015

(86) PCT No.: PCT/JP2015/072502
§ 371 (c)(1),
(2) Date: Mar. 31, 2017

(87) PCT Pub. No.: WO2016/084430
PCT Pub. Date: Jun. 2, 2016

(65) Prior Publication Data
US 2017/0307028 A1    Oct. 26, 2017

(30) Foreign Application Priority Data

Nov. 25, 2014    (JP) .................................. 2014-237611

(51) Int. Cl.
*F16D 25/06* (2006.01)
*F16D 33/18* (2006.01)
(Continued)

(52) U.S. Cl.
CPC ......... *F16D 25/0635* (2013.01); *F16D 33/18* (2013.01); *F16H 45/02* (2013.01);
(Continued)

(58) Field of Classification Search
None
See application file for complete search history.

(56) References Cited

U.S. PATENT DOCUMENTS 2,669,475 A * 2/1954 Kinker .................... E05C 17/22
                                                    292/106
4,844,216 A * 7/1989 Fukushima ............. F16H 45/02
                                                    192/3.26
(Continued)

FOREIGN PATENT DOCUMENTS

CN    1102870 A    5/1995
CN    1111329 A    11/1995
(Continued)

OTHER PUBLICATIONS

International Search Report dated Oct. 27, 2015 for corresponding foreign Application No. PCT/JP2015/072502, 2 pp.
(Continued)

*Primary Examiner* — Colby M Hansen
(74) *Attorney, Agent, or Firm* — United IP Counselors, LLC

(57) ABSTRACT

A torque converter includes a front cover, an impeller, an output shaft member, a turbine and a clutch. The turbine includes a turbine shell, a turbine blade, a coupling portion and a piston portion. The turbine shell is supported by the output shaft member. Additionally, the turbine shell slides on the output shaft member in an axial direction. The turbine blade is attached to the turbine shell. The coupling portion extends from the turbine shell toward the front cover. The piston portion extends from the coupling portion in a radial direction. The clutch is disposed between the piston portion and the front cover.

5 Claims, 2 Drawing Sheets

(51) Int. Cl.
    *F16H 45/02*     (2006.01)
    *F16D 25/0635*   (2006.01)
    *F16D 3/12*      (2006.01)

(52) U.S. Cl.
    CPC ........ *F16D 3/12* (2013.01); *F16H 2045/0215* (2013.01); *F16H 2045/0247* (2013.01); *F16H 2045/0278* (2013.01); *F16H 2045/0294* (2013.01)

(56) References Cited

U.S. PATENT DOCUMENTS

| | | | | |
|---|---|---|---|---|
| 5,224,576 | A * | 7/1993 | Fujimoto | F16H 45/02 192/212 |
| 5,566,801 | A * | 10/1996 | Fukunaga | F16H 45/02 192/12 A |
| 5,813,505 | A | 9/1998 | Olsen et al. | |
| 6,267,213 | B1 * | 7/2001 | Yamaguchi | F16H 45/02 192/212 |
| 6,269,923 | B1 * | 8/2001 | Yamashita | F16H 45/02 192/213 |
| 6,321,891 | B1 | 11/2001 | Olsen et al. | |
| 2013/0230385 | A1 | 9/2013 | Lindemann et al. | |
| 2014/0097055 | A1 | 4/2014 | Lindenmann et al. | |

FOREIGN PATENT DOCUMENTS

| | | |
|---|---|---|
| CN | 1519485 A | 8/2004 |
| CN | 101349342 A | 1/2009 |
| DE | 19626685 A1 | 1/1997 |
| FR | 2736982 A1 | 1/1997 |
| FR | 2787854 A1 | 6/2000 |
| GB | 2303430 A | 2/1997 |
| GB | 2338280 A | 12/1999 |
| GB | 2338538 A | 12/1999 |
| JP | H3100652 U | 10/1991 |
| JP | H932904 A | 2/1997 |
| JP | 2000257695 A | 9/2000 |
| JP | 2008133966 A | 6/2008 |

OTHER PUBLICATIONS

First Office Action of the corresponding Chinese patent application No. 201580056965.5, dated Nov. 13, 2018, 7 pp.

\* cited by examiner

FLUID COUPLING

CROSS-REFERENCE TO RELATED APPLICATIONS

This application is the U.S. National Phase of PCT International Application No. PCT/JP2015/072502, filed on Aug. 7, 2015. That application claims priority to Japanese Patent Application No. 2014-237611, filed Nov. 25, 2014. The contents of both applications are herein incorporated by reference in their entirety.

BACKGROUND

Technical Field

The present disclosure relates to a fluid coupling.

Background Art

A fluid coupling includes an impeller and a turbine in its interior, and transmits a torque through hydraulic oil contained in its interior. The impeller is fixed to a front cover into which a torque is inputted from an engine. The turbine is disposed in opposition to the impeller within a fluid chamber. When the impeller is rotated, the hydraulic oil flows from the impeller to the turbine. The flow of the hydraulic oil rotates the turbine, whereby the torque is outputted.

A lock-up device is disposed between the front cover and the turbine. The lock-up device mechanically couples the front cover and the turbine, whereby the torque is directly transmitted from the front cover to the turbine.

The lock-up device is not installed in a torque converter disclosed in United States Patent Application Publication No. 2013/0230385 in order to produce the torque converter with a small dimension. As a result, the torque converter can be produced with a small axial dimension.

BRIEF SUMMARY

The aforementioned torque converter of U.S. Patent Application Publication No. 2013/0230385 does not include the lock-up device, but instead, includes a turbine that is movable in the axial direction. Additionally, the torque converter includes a friction member between the turbine and the impeller so as to enable the turbine and the impeller to be engaged by friction with each other. When moved toward the impeller, the turbine is engaged by friction with the impeller through the friction member. Accordingly, the torque from the engine can be directly transmitted to the turbine. In other words, a lock-up state can be made.

Incidentally, a general lock-up device moves the turbine toward the front cover, whereby the lock-up state is made. By contrast, the torque converter of U.S. Patent Application Publication No. 2013/0230385 moves the turbine toward the impeller, in other words, oppositely to the front cover, whereby the lock-up state is made. This construction results in a drawback that a direction of fluid to be supplied for making a lock-up state in the torque converter of U.S. Patent Application Publication No. 2013/0230385 is different from that in the general torque converter.

It is an object of the present disclosure to provide a fluid coupling that can be compactly produced without changing a supply direction of fluid to be supplied when a lock-up state is made.

A fluid coupling according to an aspect of the present disclosure is rotatable about a rotational axis. The fluid coupling includes a front cover, an impeller, an output shaft member, a turbine and a clutch. The front cover is a constituent element into which a torque is inputted. The impeller includes an impeller shell and an impeller blade. The impeller shell is fixed to the front cover. The impeller blade is attached to the impeller shell. The output shaft member is rotatable about the rotational axis and outputs the torque. The turbine includes a turbine shell, a turbine blade, a coupling portion and a piston portion. The turbine shell is supported by the output shaft member. Additionally, the turbine shell is capable of sliding on the output shaft member in an axial direction. The turbine blade is attached to the turbine shell. The coupling portion extends from the turbine shell toward the front cover. The piston portion extends from the coupling portion in a radial direction. The clutch is disposed between the piston portion and the front cover.

According to this construction, when the turbine is moved toward the front cover, the piston portion and the front cover are engaged through the clutch. As a result, the torque from the front cover is directly transmitted to the turbine through the clutch. Thus, in the fluid coupling according to the disclosure of the present application, the turbine is moved toward the front cover when a lock-up state is made. Hence, a supply direction of fluid is the same as that in a general fluid coupling.

Additionally, the piston portion is coupled to the turbine shell through the coupling portion. In other words, the piston portion is supported by the output shaft member through the turbine shell. Hence, it is not required to install a member for supporting the piston portion on the radially inner side of the piston portion. Therefore, due to the space located on the radially inner side of the piston portion, the fluid coupling can be reduced in dimension by that much.

The fluid coupling may further include a damper mechanism. The damper mechanism couples the turbine and the output shaft member so as to make the turbine and the output shaft member rotatable relatively to each other.

The damper mechanism may include a holder member and an elastic member. The holder member is unitarily rotated with the output shaft member. The elastic member is held by the holder member.

The turbine may further include a first engaging part. The first engaging part extends from the turbine shell to the elastic member.

The turbine may further include a second engaging part. The second engaging part extends from the piston portion to the elastic member.

The clutch may be a friction member attached to the piston portion.

The fluid coupling according to the present disclosure can be compactly produced without changing a direction of fluid to be supplied when a lock-up state is made.

DETAILED DESCRIPTION OF EMBODIMENTS

Figure 1:
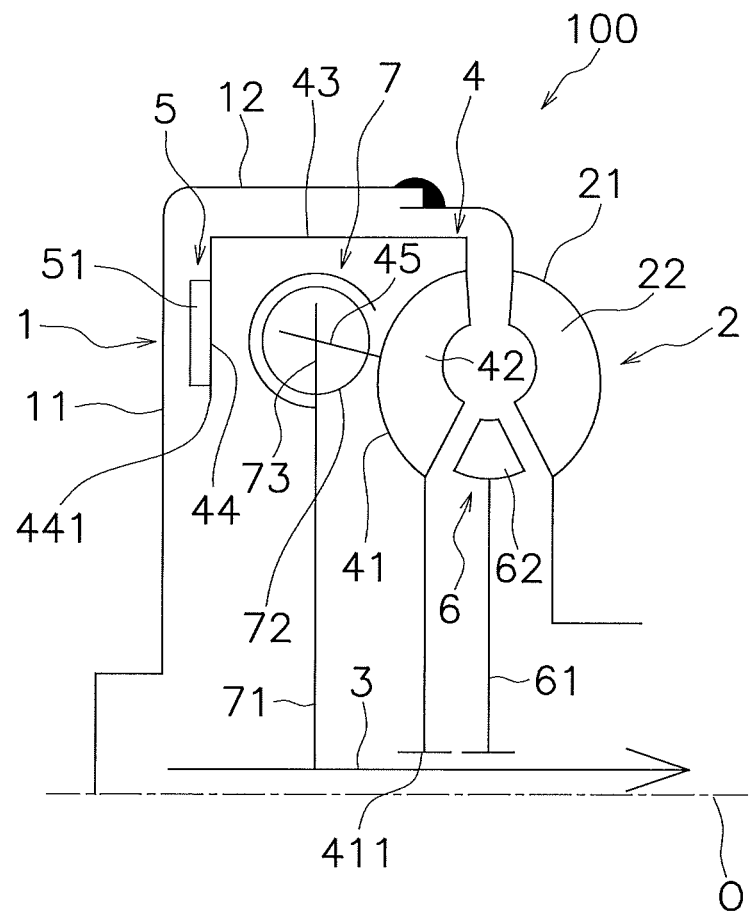
FIG. 1 is a schematic diagram of a torque converter.

A torque converter 100, which is an exemplary embodiment of a fluid coupling according to the present disclosure, will be hereinafter explained with reference to drawings. FIG. 1 is a schematic diagram of the torque converter. In the following explanation, the term "axial direction" means an extending direction of a rotational axis O of the torque converter 100. Additionally, the term "radial direction" means a radial direction of an imaginary circle about the rotational axis O. The term "circumferential direction" means a circumferential direction of the imaginary circle about the rotational axis O. A right-and-left direction in FIG. 1 is synonymous with the term "axial direction". It should be noted that an engine is disposed on the left side in FIG. 1 whereas a transmission is disposed on the right side in FIG. 1, although the engine and the transmission are not shown in FIG. 1.

As shown in FIG. 1, the torque converter 100 is rotatable about the rotational axis O. The torque converter 100 includes a front cover 1, an impeller 2, an output shaft member 3, a turbine 4 and a clutch 5. Additionally, the torque converter 100 further includes a stator 6 and a damper mechanism 7.

The front cover 1 is a member into which a torque from the engine is inputted. When described in detail, the front cover 1 includes a disc part 11 and a tubular part 12. The tubular part 12 extends from an outer peripheral end of the disc part 11 toward the transmission.

The impeller 2 includes an impeller shell 21 and a plurality of impeller blades 22. The impeller shell 21 is fixed to the front cover 1. When described in detail, the impeller shell 21 is welded to the front cover 1.

The impeller blades 22 are attached to the impeller shell 21. When described in detail, the impeller blades 22 are fixed to the inner peripheral surface of the impeller shell 21.

The turbine 4 includes a turbine shell 41, a plurality of turbine blades 42, a coupling portion 43 and a piston portion 44. The turbine 4 is disposed in opposition to the impeller 2. The turbine shell 41, the coupling portion 43 and the piston portion 44 are integrally provided.

The turbine shell 41 is supported by the output shaft member 3. When described in detail, the turbine shell 41 makes contact at its inner peripheral surface 411 with the output shaft member 3. The turbine shell 41 is capable of axially sliding on the output shaft member 3. Additionally, the turbine shell 41 is rotatable relatively to the output shaft member 3. When described in detail, the turbine shell 41 radially extends from the output shaft member 3.

The turbine blades 42 are attached to the turbine shell 41. When described in detail, the turbine blades 42 are fixed to the inner peripheral surface of the turbine shell 41.

The coupling portion 43 extends from the turbine shell 41 toward the front cover 1. When described in detail, the coupling portion 43 extends from the outer peripheral end of the turbine shell 41. Additionally, the coupling portion 43 extends along the axial direction. The coupling portion 43 has a cylindrical shape.

The coupling portion 43 is fixed to the turbine shell 41. For example, the coupling portion 43 is welded to the turbine shell 41. It should be noted that the coupling portion 43 maybe integrated with the turbine shell 41 as a single member.

The piston portion 44 radially extends from the coupling portion 43. When described in detail, the piston portion 44 extends radially inside from the coupling portion 43. The piston portion 44 extends from the front cover 1—side end of the coupling portion 43 toward the output shaft member 3. The piston portion 44 may be integrated with the coupling portion 43 as a single member.

The piston portion 44 is an annular plate. The outer peripheral end of the piston portion 44 and that of the turbine shell 41 are coupled through the coupling portion 43. The piston portion 44 is disposed in the radial vicinity of the outer peripheral end of the front cover 1.

The piston portion 44 includes an opening in its middle part. An inner peripheral surface 411 of the piston portion 44 is located radially away from the output shaft member 3. In other words, the inner peripheral surface 441 of the piston portion 44 does not make contact with the output shaft member 3. Therefore, a space is produced between the output shaft member 3 and the inner peripheral surface 441 of the piston portion 44.

For example, the distance between the outer peripheral surface of the output shaft member 3 and the inner peripheral surface 441 of the piston portion 44 is about 30 mm or greater. Additionally, the inner diameter of the piston portion 44 is, for instance, greater than or equal to about twice the outer diameter of the output shaft member 3. It should be noted that torque converters have various sizes, and hence, the upper limit of the distance between the outer peripheral surface of the output shaft member 3 and the inner peripheral surface 441 of the piston portion 44 is not limited to a specific value.

The turbine 4 further includes a plurality of first engaging parts 45. The first engaging parts 45 extend from the turbine shell 41 to elastic members 72 of the damper mechanism 7 to be described, respectively. Each first engaging part 45 is engaged with each elastic member 72. When described in detail, each first engaging part 45 makes contact with one end surface of each elastic member 72 in the circumferential direction. The first engaging parts 45 are disposed at intervals in the circumferential direction. The first engaging parts 45 are welded to the turbine shell 41.

The stator 6 is configured to regulate the flow of hydraulic oil returning from the turbine 4 to the impeller 2. The stator 6 is disposed between the impeller 2 and the turbine 4. The stator 6 includes a stator carrier 61 having a disc shape and a plurality of blades 62 mounted to the outer peripheral surface of the stator carrier 61.

The stator 6 is rotatable about the rotational axis O. When described in detail, the stator 6 is supported by a stationary shaft (not shown in the drawing) through a bearing (not shown in the drawing).

The clutch 5 is disposed between the piston portion 44 and the front cover 1. The clutch 5 is configured to transmit or block the torque from the front cover 1 to the piston portion 44.

The clutch 5 is a friction member 51 attached to the piston portion 44. It should be noted that the friction member 51 may be attached to the front cover 1. In this construction, the friction member 51 is opposed to the piston portion 44.

The output shaft member 3 is rotatable about the rotational axis O. The output shaft member 3 outputs the torque. When described in detail, the output shaft member 3 outputs the torque from the engine to the transmission. It should be noted that when a lock-up state is not being made, the output shaft member 3 outputs to the transmission the torque sequentially transmitted thereto in the order of the front cover 1, the impeller 2, the turbine 4 and the damper mechanism 7. When the lock-up state is being made, the output shaft member 3 outputs to the transmission the torque sequentially transmitted thereto in the order of the front cover 1, the turbine 4 and the damper mechanism 7.

For example, the output shaft member 3 is made in the shape of a cylinder extending in the axial direction. A transmission-side member (e.g., an input shaft member) is fitted to the interior of the output shaft member 3. With this construction, the output shaft member 3 and the transmission-side member are unitarily rotated.

The damper mechanism 7 couples the turbine 4 and the output shaft member 3 so as to make the turbine 4 and the output shaft member 3 rotatable relatively to each other. When described in detail, the damper mechanism 7 elastically connects the turbine 4 and the output shaft member 3 in the circumferential direction. The damper mechanism 7 includes a holder member 71 and the plurality of elastic members 72.

The holder member 71 extends in the radial direction. The holder member 71 is unitarily rotated with the output shaft member 3. In other words, the holder member 71 is fixed to the output shaft member 3. For example, the holder member 71 is fixed thereto by fastening members such as swaging rivets. It should be noted that the holder member 71 may be integrated with the output shaft member 3 as a single member.

The holder member 71 may be composed of a plurality of plates. The holder member 71 includes a plurality of third engaging parts 73. When described in detail, each third engaging part 73 makes contact with the other end of each elastic member 72 in the circumferential direction. The number of the third engaging parts 73 is the same as that of the first engaging parts 45. Each third engaging part 73 and each first engaging part 45 interpose each elastic member 72 therebetween in the circumferential direction.

The elastic members 72 are held by the holder member 71. The respective elastic members 72 are, for instance, coil springs. It should be noted that the elastic members 72 are disposed at intervals in the circumferential direction.

Next, explanation will be provided for an action to be performed by the torque converter 100 when the lock-up state is made. When the lock-up state is made in the torque converter 100, the hydraulic oil is supplied to the space between the turbine shell 41 and the impeller shell 21. When described in detail, the space between the turbine shell 41 and the impeller shell 21 has been already filled with the hydraulic oil. Hence, the hydraulic oil, residing in the space between the turbine shell 41 and the impeller shell 21, is raised in hydraulic pressure by further supplying the hydraulic oil to the space.

When the hydraulic oil, residing in the space between the turbine shell 41 and the impeller shell 21, is raised in hydraulic pressure, the turbine 4 is moved in a direction separating from the impeller 2, i.e., toward the front cover 1. As a result, the friction member 51 attached to the piston portion 44 is engaged by friction with the front cover 1. The front cover 1 and the turbine 4 are unitarily rotated. In other words, the torque from the front cover 1 is transmitted to the turbine 4 without through the impeller 2.

When the lock-up state is released in the torque converter 100, the hydraulic oil is supplied to the space between the turbine shell 41 and the front cover 1. The turbine 4 is thereby moved in a direction separating from the front cover 1. As a result, frictional engagement between the friction member 51 attached to the piston portion 44 and the front cover 1 is released. In other words, the torque from the front cover 1 is transmitted to the turbine 4 through the impeller 2.

In the torque converter 100 according to the aforementioned exemplary embodiment, the directions of the hydraulic oil to be supplied when the lock-up state is made and when the lock-up state is released are the same as those in a well-known torque converter.

Additionally, in the torque converter 100, the piston portion 44 is supported by the output shaft member 3 through the coupling portion 43 and the turbine shell 41. With this construction, only an outer peripheral side space is required for disposing the piston portion 44. Hence, it is possible to form a space between the inner peripheral surface 441 of the piston portion 44 and the output shaft member 3. Therefore, by utilizing this space for the purposes of, e.g., installation of a component of the torque converter, the torque converter can be made compact by that much.

[Modifications]

The exemplary embodiment of the present disclosure has been described above. However, the present disclosure is not limited to the aforementioned exemplary embodiment, and a variety of changes can be made without departing from the scope of the present disclosure.

Modification 1

Figure 2:
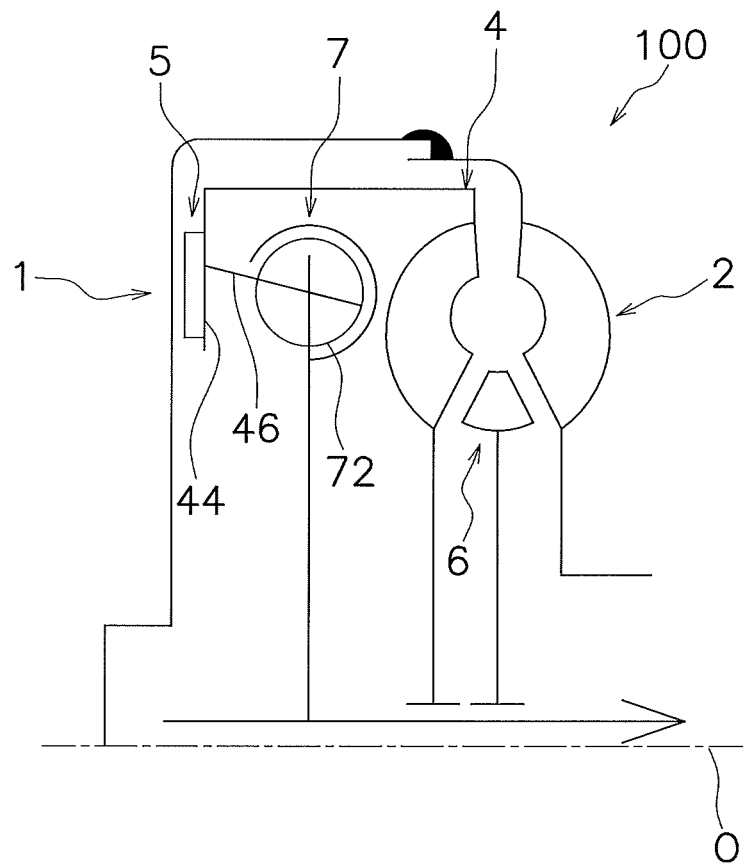
FIG. 2 is a schematic diagram of a torque converter according to modification 1.

As shown in FIG. 2, the turbine 4 may include second engaging parts 46 instead of the first engaging parts 45. Each second engaging part 46 extends from the piston portion 44 to each elastic member 72. When described in detail, each second engaging part 46 makes contact with one end surface of each elastic member 72 in the circumferential direction. The second engaging parts 46 are disposed at intervals in the circumferential direction. The second engaging parts 46 are welded to the piston portion 44. Each elastic member 72 is interposed by each second engaging part 46 and each third engaging part 73 in the circumferential direction.

Modification 2

The clutch 5 may be a multi-plate clutch. In other words, the clutch 5 maybe constructed to include a plurality of friction plates.

Modification 3

The damper mechanism 7 may include another type of elastic members on the radially inner side of the elastic members 72. In other words, the torque from the turbine 4 may be transmitted to the output shaft member 3 through two types of elastic members composed of elastic members disposed on the outer peripheral side and elastic members disposed on the inner peripheral side.

REFERENCE SIGNS LIST

1 Front cover
2 Impeller
21 Impeller shell
22 Impeller blade
3 Output shaft member
4 Turbine
41 Turbine shell
42 Turbine blade
43 Coupling portion
44 Piston portion
45 First engaging part
46 Second engaging part
5 Clutch
51 Friction member
7 Damper mechanism
100 Torque converter

The invention claimed is:

1. A fluid coupling rotatable about a rotational axis, the fluid coupling comprising:
   a front cover into which a torque is inputted;
   an impeller including an impeller shell and an impeller blade, the impeller shell being fixed to the front cover, the impeller blade being attached to the impeller shell;
   an output shaft member rotatable about the rotational axis, the output shaft member outputting the torque;
   a turbine including a turbine shell, a turbine blade, a coupling portion and a piston portion, the turbine shell supported by the output shaft member, the turbine shell slidable on the output shaft member in an axial direction, the turbine blade being attached to the turbine shell, the coupling portion extending from an outer peripheral end of the turbine shell toward the front cover, the piston portion extending from the coupling portion in a radial direction;

a clutch disposed between the piston portion and the front cover; and a damper mechanism configured to couple the turbine and the output shaft member so as to make the turbine and the output shaft member rotatable relative to each other, the damper mechanism disposed between the turbine shell and the piston in the axial direction.

2. The fluid coupling according to claim 1, wherein the damper mechanism includes a holder member and an elastic member, the holder member unitarily rotated with the output shaft member, the elastic member held by the holder member.

3. The fluid coupling according to claim 2, wherein the turbine further includes a first engaging part extending from the turbine shell to the elastic member.

4. The fluid coupling according to claim 2, wherein the turbine further includes a second engaging part extending from the piston portion to the elastic member.

5. The fluid coupling according to claim 1, wherein the clutch is a friction member attached to the piston portion.

\* \* \* \* \*